F. O. WOODLAND.
CIGAR BANDING MACHINE.
APPLICATION FILED OCT. 6, 1910.
1,096,584.
Patented May 12, 1914.
6 SHEETS—SHEET 1.
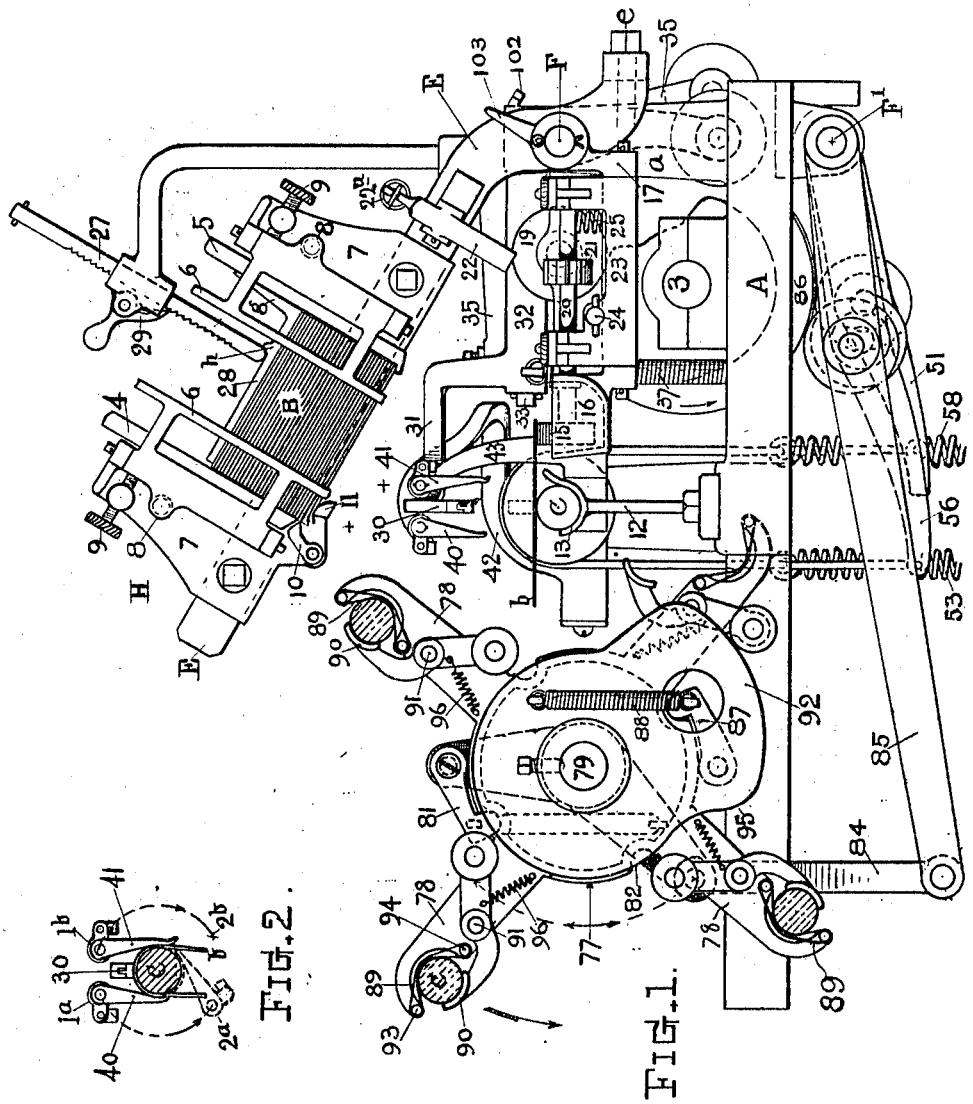
Witnesses.
Ella P. Blenus
S. P. Morris.
Inventor-
Frank O. Woodland,
By Chas. H. Burleigh
Attorney.

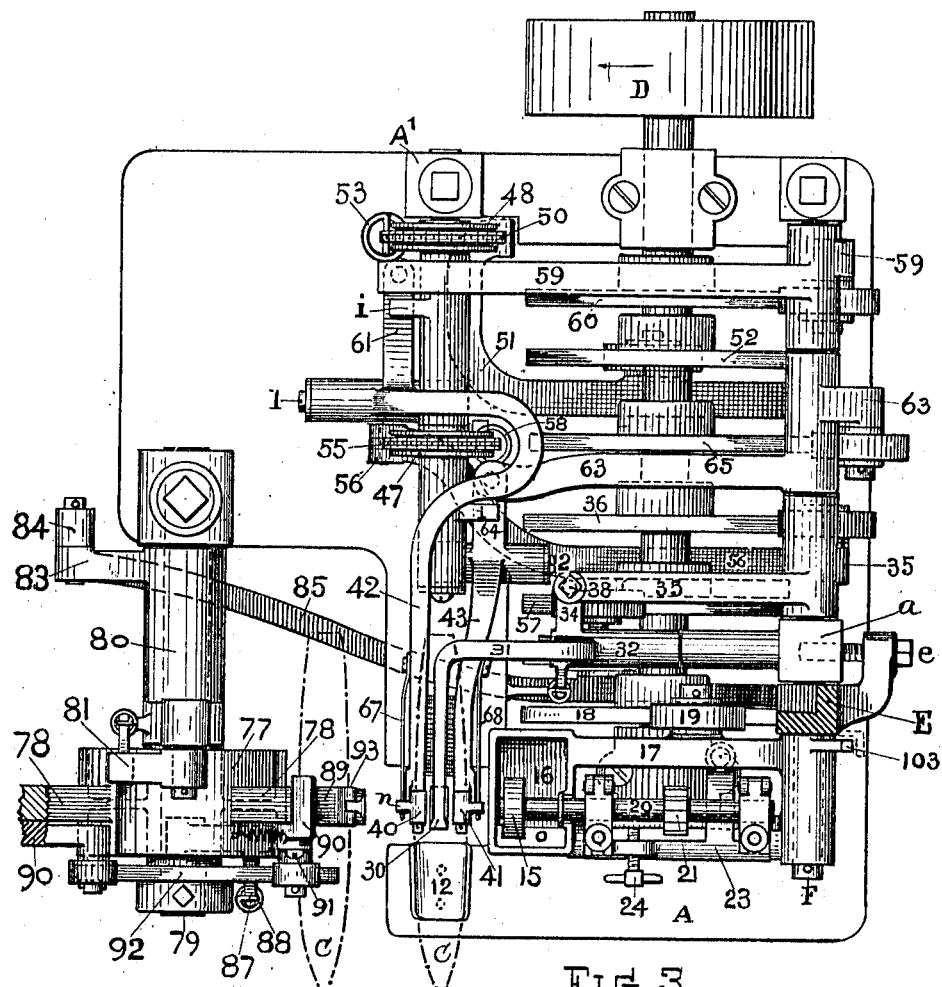

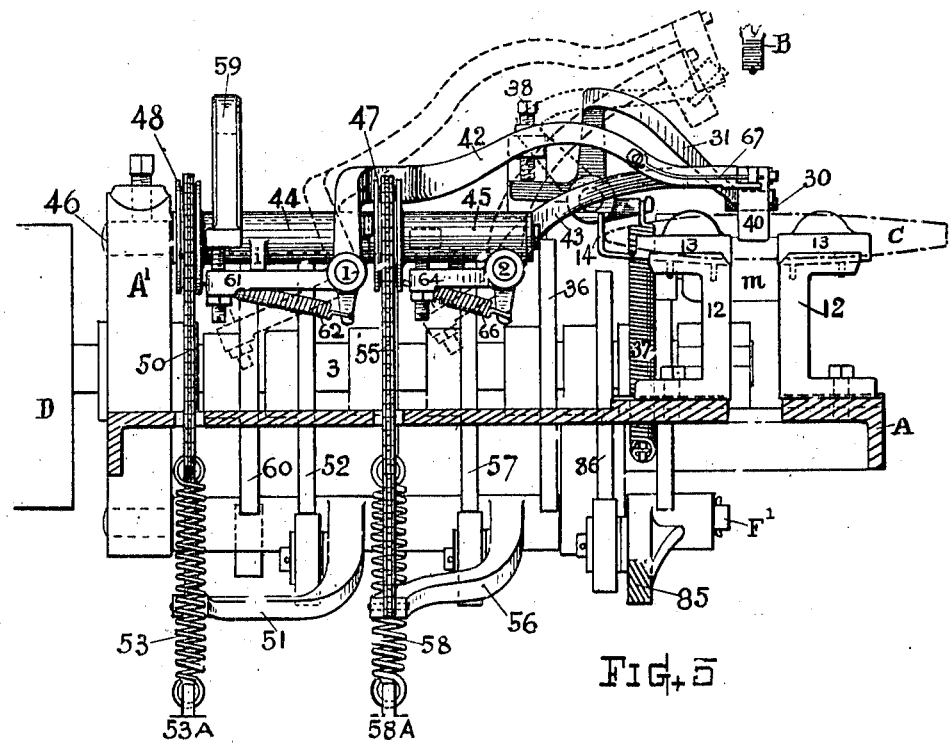
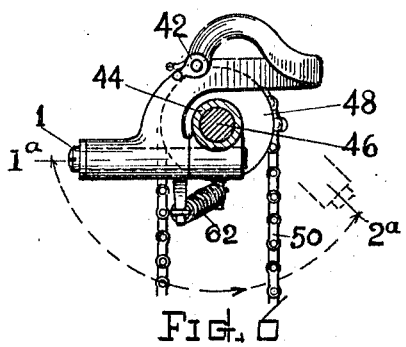
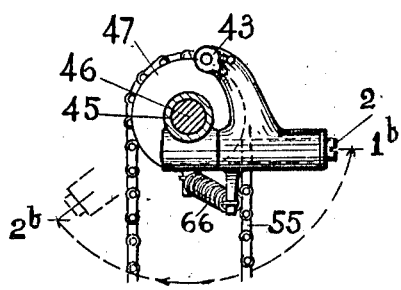

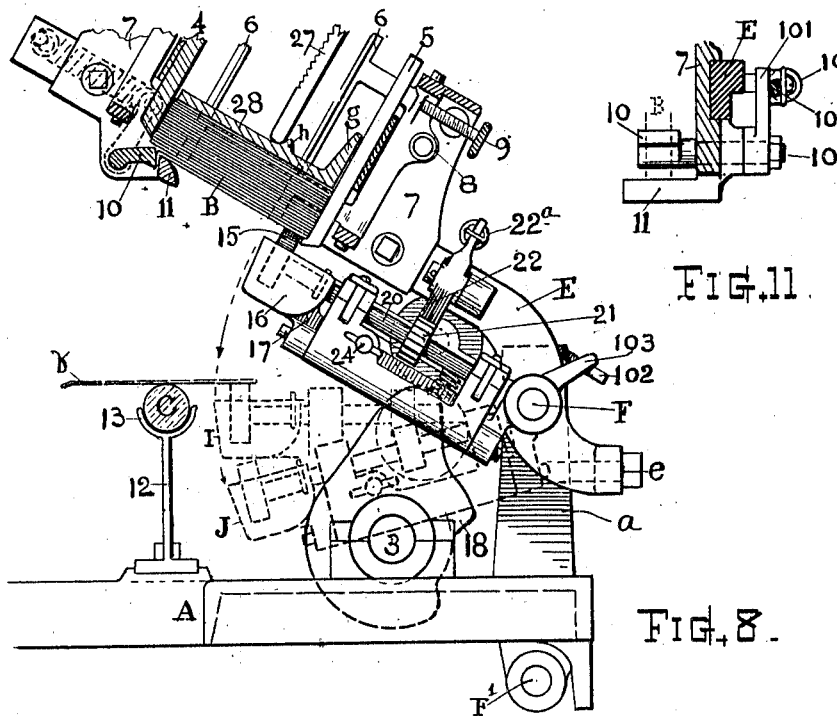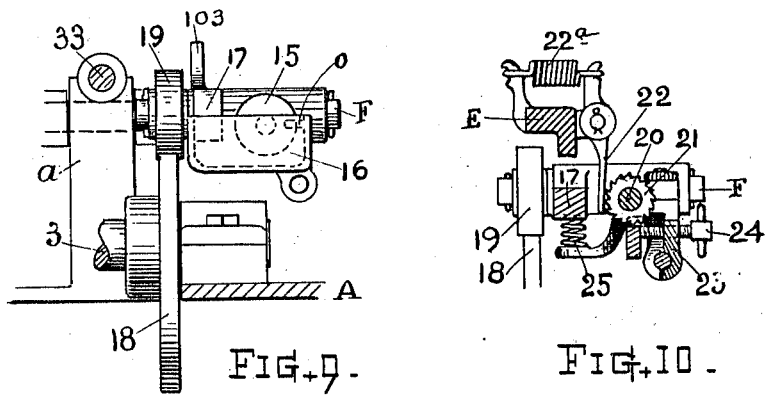

F. O. WOODLAND.
CIGAR BANDING MACHINE.
APPLICATION FILED OCT. 6, 1910.
1,096,584.
Patented May 12, 1914.
6 SHEETS—SHEET 5.
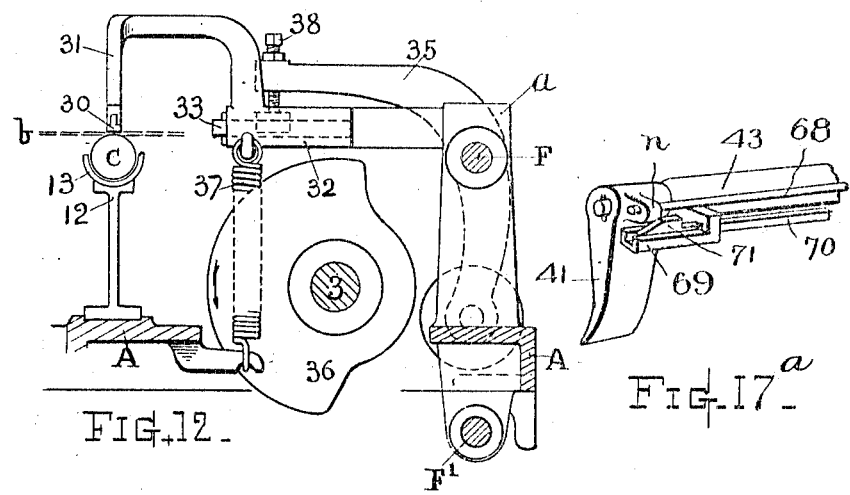
Fig. 12. Fig. 17a
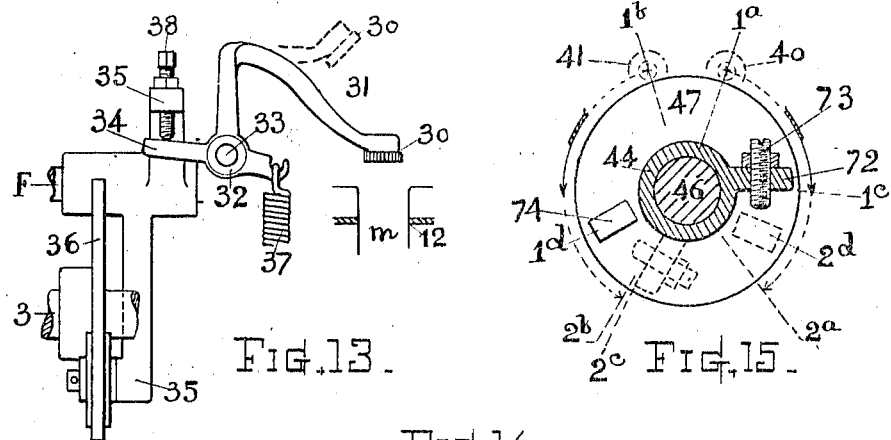
Fig. 13. Fig. 14. Fig. 15.
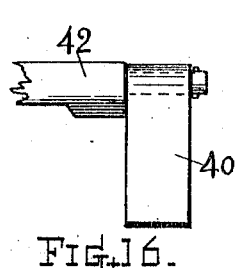
Fig. 16.
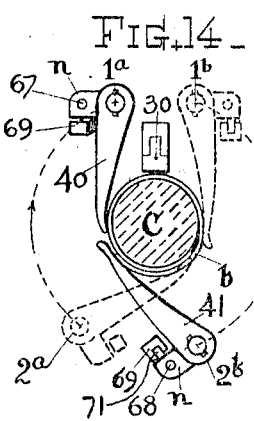
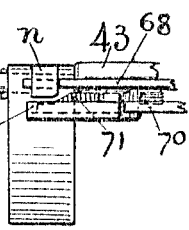
Fig. 17.
Witnesses.
Ella P. Blenus
S. P. Morris.
Inventor.
Frank O. Woodland
By Chas. H. Burleigh
Attorney

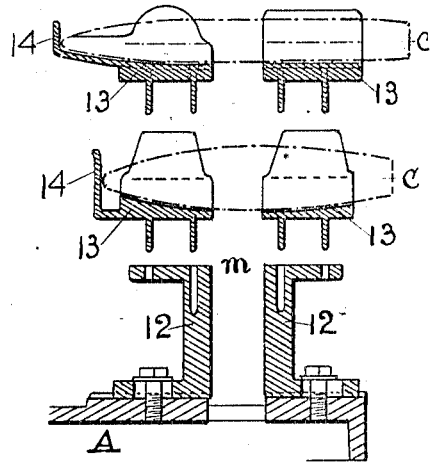
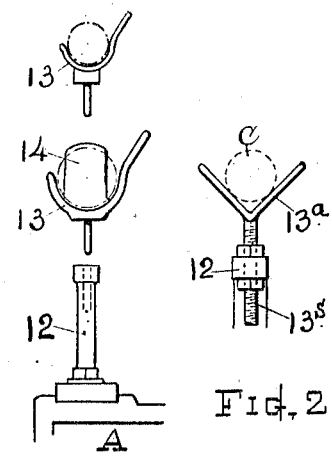
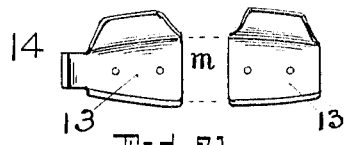
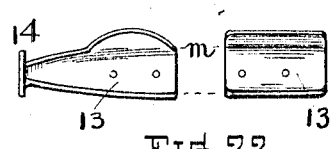
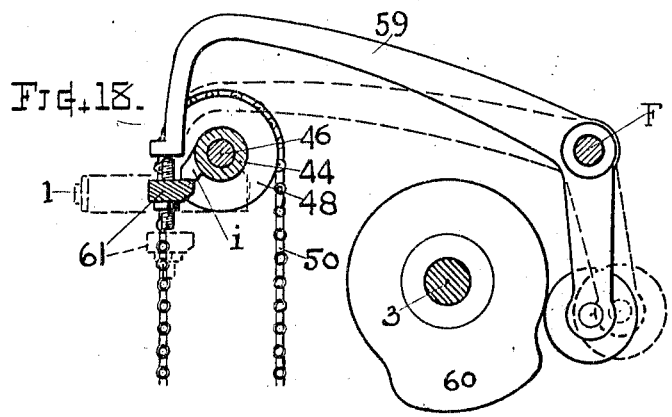

UNITED STATES PATENT OFFICE.

FRANK O. WOODLAND, OF WORCESTER, MASSACHUSETTS.

CIGAR-BANDING MACHINE.

1,096,584. Specification of Letters Patent. Patented May 12, 1914.

Application filed October 6, 1910. Serial No. 585,619.

*To all whom it may concern:*

Be it known that I, FRANK O. WOODLAND, a citizen of the United States, residing at Worcester, in the county of Worcester and State of Massachusetts, have invented a new and useful Cigar-Banding Machine, of which the following is a specification, reference being made therein to the accompanying drawings.

This invention relates to a novel organization of mechanism for automatically affixing bands or encircling labels upon cigars or the like; also to the improved construction, combination and mode of operation of means for gumming, feeding and delivering the bands; and means for applying the bands about the cigars; the prime object of my invention being to provide an efficient and practically convenient means for the purpose set forth.

Another object is to provide a supplemental means for receiving the freshly banded cigars, retaining the same to insure a thorough adhesion of the gum or glue, and then discharging the cigars, or article, at a predetermined position.

The nature and mode of operation of my invention, as embodied in a preferred form of mechanism, is set forth in detail and more fully explained, in respect to the objects and features of invention, by the following description, with reference to the drawings; the particular subject matter claimed being definitely specified in the summary.

In the drawings, (six sheets) Figure 1 represents a front elevation view of a preferred form of mechanism embodying my invention. Fig. 2 is a fragmentary view illustrating the primary action of the winding-on devices upon the band. Fig. 3 represents a plan view of the machine, the band-holder means being omitted the better to reveal underlying parts. Fig. 4 is a horizontal plan view of the band-holder means (omitted from Fig. 3), without the follower devices therefor. Fig. 5 is a side elevation view of the mechanism for closing or lapping the bands upon the cigar, and the actuating devices therefor. Figs. 6 and 7 represent separate end views of the respective oscillators and swinging lapper-carrying arms mounted thereon, the dotted lines indicating the range of their oscillative movement. Fig. 8 is a partial sectional elevation showing the glue-applying and band-delivering means; certain positions of the glue-applying devices at different stages in the action, being illustrated by dotted lines. Fig. 9 is a separate detail end view of the glue-box. Fig. 10 is a transverse section of the glue-roll shaft and adjacent parts. Fig. 11 is a sectional detail view illustrating means for crimping the ends of the bands. Fig. 12 is a detail front view of the grip mechanism, and Fig. 13 is a side view of the same. Fig. 14 is a separate detail front view illustrating the action of the band-lapping members. Fig. 15 is a detail sectional view showing means for preventing contact or interference of the lappers with each other. Fig. 16 is a face view and Fig. 17 a back view of one of the lappers and the end of its carrier arm. Fig. 17ª is a perspective view for clearer illustration of the parts shown in Fig. 17. Fig. 18 is a sectional elevation showing means for tilting one of the oscillating lapper carrier-levers. Fig. 19 represents, in vertical longitudinal section, the detail of a two-part supporting rest, with two sets of interchangeable cradle members as for different shaped cigars; the cradle members being shown as separated from the standards. Fig. 20 represents an end view of the same. Figs. 21 and 22 represent plan views of the two sets of interchangeable cradle members and Fig. 23 shows a modification in the form of cradle member, and having means for adjusting the level thereof.

The preferred form of mechanism, for carrying out my invention in practice, comprises, as herein illustrated, a band-supply holder adapted for supporting a pack of cigar bands, or the like; gumming or glue-applying means that swings upward for contact with the bottom of the pack at or near one end of the bands, and downward for adhesively taking the bands, one at a time, from the holder and presenting the same at a predetermined position in convenient adjacence to a suitable cigar-supporting rest; a means for temporarily gripping or clamping the presented band against a cigar or like article lying upon said rest; a pair of oppositely acting lappers or oscillating means for winding-on or lapping the respective ends of the band about a cigar or like article, tucking the non-glued underlying end of the band beneath the glued or overlying end thereof, and applying an over-riding pressure thereto. Said lappers or winding-on devices and the gripping means are retraceable for the release of the banded cigar and for permitting an unobstructed feedway for the cigar and succeeding band.

For operation in connection with the band-affixing mechanism, I provide and preferably employ an intermittently rotative carrier comprising a series of projecting arms provided with automatic means for severally clasping the freshly banded cigars about their band taking the cigars off the positioning rest; holding the same for a limited time, and transferring and delivering the cigars at a predetermined position, or into a suitable receptacle, as may be desired.

Referring to the drawings, A denotes the frame, which may be of any suitable construction.

F and F¹ indicate the fulcrum-rods or axes for various levers, and 3 indicates an operating shaft, or cam-shaft, mounted to turn in bearings upon the frame, and provided with a drive means D, of any approved kind, for applying the motive power thereto.

The band-supply holder H is arranged upon a bar or arm E mounted on the fulcrum-rod F, and having a projecting member with a screw or bolt e therethrough which connects it with the upright part a of the frame. By means of said screw the arm can be adjusted for carrying the band-holder at a somewhat higher or lower position in relation to the under located parts.

The holder H comprises end-guiding stakes 4 and 5, one of which is formed with a toe or point for supporting the pack of bands B. Laterally adjustable side-guiding devices 6 are pivotally supported upon bracket plates 7 that are adjustably secured upon the arm E, and can be adjusted thereon by means of their attaching screws to accommodate different lengths of bands. The side-guiding devices 6 are adjustable for wider or narrower bands, by means of the thumb screws 9 and springs 8.

For positioning and supporting the cigar while the band is applied thereto, I provide a rest 12 having a trough-shaped cradle or seat portion 13 formed in two parts, with an intervening space m to permit the passage of the band and band-affixing devices about the cigar C. The top members or cradle portions are best made removable from the standards thereof (see Fig. 19) and interchangeable in various sizes and forms, so that by an interexchange of cradle-members the mechanism is adapted for cigars, or like articles, of different sizes and styles. One of the members is provided with an end-guide or stop 14 to insure uniformity in the positioning of the cigars, which may be laid upon the rest by hand, or otherwise delivered into the receiving cradle. One side of the cradle may be made with a high lip, if desired, to serve as a guide in placing cigars thereon.

For applying the glue or adhesive substance to the bands and taking them from the holder H to the place of affixment, the mechanism preferably comprises a suitable glue-applying member or roller 15 and a glue-box 16 carried by an arm 17 fulcrumed on the rod F to swing up and down, as actuated by a cam 18 carried by the shaft 3, which cam runs against a stud-roll 19 in connection with the arm. (See Figs. 3, 8 and 9.) The glue-roll 15 runs in the glue-box receptacle, which is adapted for containing thick glue, paste, gum or other adhesive, and is best provided with a gage scraper O. The glue-roll shaft 20 extends along the arm and is mounted in suitable bearings connected therewith; said shaft being provided with a ratchet 21 or means for its rotation. The glue-roll and its shaft are loosely confined, endwise, within the glue-box by the end of the shaft and a shoulder or collar on said shaft fitting against the interior of the box. The bearing caps for the shaft journals are hinged and held down by swinging bolts, whereby the glue-roll shaft is readily released to be taken out or replaced at will.

In the present instance the glue-roll-shaft bearings are connected with a rocker piece 23 pivotally supported in connection with the arm 17 to swing slightly backward or forward. An adjusting screw 24 and a spring 25 are combined therewith (see Fig. 10) in a manner to facilitate the adjustment of the roller in relation to the gage-scraper edge. When elevated the glue-roll 15 contacts with the bottom band in the pack, at or near the end thereof, and by adhesive action releases the end of the band from the under projecting toe of the guide stake 5 and withdraws its opposite end from the band holder when the glue roll descends.

The band-holder arm E in the present instance is shown as arranged upwardly inclined, the band-holder being disposed oblique to the plane at which the bands are presented for affixment, and to the general mechanism. The pack of bands thus naturally gravitates toward the stake 5 while in the holder, so that said stake serves as a gage or uniform point of alinement in relation to the point of contact of the gluing member or roll 15. A suitable automatic resistance follower device 27 and plate 28 are provided for preventing the lifting of the pack by contact of the glue-applying member. Said follower is best shown in Fig. 1, and consists of a rod 27, a guide therefor, and a pawl or clutch device 29 that releases the rod for downward action, but resists upward pressure. The follower-plate is preferably provided with an upstanding angular flanged end *g* that slides against the stake 5 and with a groove or lug *h* for keeping the end of the follower rod in proper relation to the inclined plate.

The band or label taken from the pack B is presented, by the descending of the gluing devices, across the top of the cigar C, as shown at *b* on Figs. 1 and 8. The action of the gluing means is indicated on Fig. 8. The glue-box swings up to the position indicated in full lines, bringing the roll into contact with the bottom of the pack for taking the band; then descends to the position indicated by dotted lines I for delivering the band across the article to which it is to be affixed. It then further descends, as indicated by dotted lines J for releasing the band from the face of the glue-roll 15 after the band has been clamped in position. While the glue-box moves upward the pawl 22, pivoted upon the arm E, engages the ratchet 21 and partially revolves the glue-roll 15 to give a fresh glued area for contact with the band. The spring 22ª permits the pawl to release and pass the ratchet. (See Fig. 10.)

The numeral 30 indicates a grip-device for temporarily clamping the band against the cigar as soon as presented thereto. Said grip-device is carried by a suitably shaped swinging arm 31 attached to a rocker 32 mounted upon an axis-stud 33 supported by the frame, as best shown in Figs. 2, 5, 12 and 13. The rocker, as herein shown, is furnished with a projecting arm 34; and adjacent to the arm there is arranged a swinging lever 35, fulcrumed on the rod F, and actuated by a cam 36 upon shaft 3, which cam acts against a stud-roll mounted on said lever, for moving said rocker and grip device in one direction; while a pull spring 37 is suitably connected with the rocker 32 and to an anchorage on the frame, and serves for moving the rocker and grip-device in opposition to the lever. The end of the lever 35 is best provided with an adjusting screw 38 for contact with arm 34, and a check-nut for retaining the screw at adjusted position. The grip-device is preferably arranged to be lifted by the lever action; and depressed by the spring, so as to grip the band against the cigar with a yielding pressure, thus avoiding liability of crushing the fabric.

Combined with the band-supply holder, in adjacent relation to the outer end of the pack, I preferably provide means for crimping or bending the end of the band. Said means as shown, (see Figs. 4, 8, and 11) comprises a movable member or oscillating jaw 10 and a stationary member or bar 11 that upholds the band while the jaw moves down and bends or offsets the band across the angular edge of said bar. The oscillating jaw is provided with an axle 100 that extends through and is journaled in the holder-bracket 7, the bar 11 being formed upon or attached to the bracket and located just beneath the end of the pack, and the parts are arranged in such manner that as the jaw 10 swings toward the supporter 11 it will catch the end of the bottom label or band and carry it past the angle of the stationary member, thereby producing an inward crimp or offset at the end of the band, the purpose of which is to cause the extremity of the band to lie close to the surface of the cigar when the band is placed thereon.

The crimper-device is preferably operated synchronously with the feed of bands, or in unison with the glue-applying devices; in the present instance by the crank-arm 101, connecting rod 102 and tappet-finger 103 upon the hub of the glue-box arm 17, which positively applies the jaw to its work, and reversely by the retracting spring 104, or other approved means can be employed.

An important and distinguishing feature of my invention consists in a means for closing the bands around the cigar, tucking under one end and sealing the other end upon the first. For this purpose I provide means consisting of a set or pair of oppositely acting oscillating wiper members, herein termed the lappers 40 and 41, which are preferably pivoted, approximately parallel to the axis of their oscillative movement, to the ends of carrier-arms or levers 42 and 43 which in turn are fulcrumed upon transversely disposed studs 1 and 2 carried upon oscillatable hubs or sleeves 44 and 45 mounted upon a stationary shaft 46, which latter is firmly fixed in a standard or portion A¹ of the frame, and disposed approximately in axial alinement with the cigar-supporting rest, as best shown in Figs. 2 and 5. Two oscillator hubs are employed, arranged end to end on the shaft 46. The rear hub 44 is provided with a wheel or sheave portion 48 having thereon, and attached thereto in suitable manner, is a chain 50 or equivalent connector, its respective ends extending a suitable distance at either side of the sheave. One end of this chain is secured to a lever 51 fulcrumed on the rod F¹ and actuated by a suitable cam 52 on the shaft 3. The end of the chain from the opposite side of the sheave is connected at one end of a pull-spring 53, the other end of which is secured to a stationary stud 53ᴬ, or any suitable anchorage device. In similar manner the hub 45 is provided with a wheel or sheave 47, and an attached chain or connector 55, one end of which is connected with a lever 56 fulcrumed on rod F¹ and actuated by the cam 57 on shaft 3; while the end of the chain at the opposite side of the sheave is joined to a pull spring 58, having its other end secured to the stationary stud, or suitable anchorage 58ᴬ. In the arrangement as herein shown, the spring 53, for the rear oscillator hub 44, is at the left, and the lever 51 at the right hand end of the chain; while for the front oscillator hub 45 the spring 58 is at the right and the lever 56 at the left. The spring 58 is made to have greater power or tension than the spring 53, for a purpose hereinafter referred to.

The lapper-carrying arms or levers 42 and 43 are made to afford an approximately radial movement of the wipers or lappers, and are of such form (see Figs. 5, 6 and 7) that they can have an oscillative movement about the axis of the shaft 46 and also a swinging movement on the studs without conflicting with each other, or with the grip-device 30. Their oscillative action is indicated, respectively, in Figs. 6 and 7, and their swinging movement is indicated in Fig. 5, by dotted lines. Suitable stops $i$ are provided upon the oscillator-hubs for arresting the swing of the lapper carrier-arms 42 and 43 when at the proper position for performing their oscillative movement.

For imparting the swing movement to the lapper-carrier arm 42 there is a lever 59 (see Figs. 8 and 18) fulcrumed on the rod F, and actuated by a cam 60 upon shaft 3, which cam runs against a stud-roll mounted on said lever. The working end of this lever is forced down upon the rearwardly extended part 61 of the lapper-carrier arm 42 by the action of the cam, thereby elevating the fore end of the carrier-arm and lapper device, as indicated by dotted lines on Fig. 5. A suitably arranged spring 62 is combined therewith for returning the carrier-arm and lapper devices to normal position. In somewhat similar arrangement there is provided a lever 63 for depressing the backwardly extended end 64 of the lapper-carrier arm 43, for elevating the front end thereof, (as per dotted lines Fig. 5) and a cam 65 for actuating said lever; also, a retracting spring 66 for the carrier-arm, as illustrated.

As herein illustrated, the lapper 40 is the under-tucking lapper, which carries the first end of the band about the cigar and tucks it under the opposite end of the band, as the latter is brought around by the second lapper 41, and overclosed, laid and sealed upon the first end; the first lapper 40 being drawn back as the overclosing lapper 41 approaches it, and just far enough in advance to avoid contact of the glued end of the band therewith.

The lapper elements 40 and 41 preferably consist of slightly curved wedge-shaped plates mounted upon their respective carrier arms 42 and 43 by a wrist-joint or hinging attachment that permits lateral swing of their lower ends. (See Figs. 5, 14, 16 and 17.) The lappers, as shown, are of substantially similar shape, excepting that the over-closing lapper 41 is preferably slightly the longest and has its contact end turned slightly outward, while the under-tucking lapper 40 has its contact end made comparatively thinner and slightly curved inward. (See Figs. 2 and 14.) Each lapper has an outstanding lug $n$ with a hole therethrough that engages with a suitable wire spring, 67 and 68, whereby the swinging lapper-plate is kept normally in proper relation when elevated, and yieldingly pressed against the work when acting. The springs 67 and 68 are respectively attached to the carrier-arms, and move with the lappers, thus regularly exerting their influence irrespective of the oscillative movement of the carrier-arms. The lappers are best arranged to be conveniently removed from and replaced upon their carrier-arms, being retained thereon simply by a cotter-pin or equivalent removable fastener, so that interchange of lappers can be readily effected when desired.

The normal positions of the oscillating hubs and lappers and grip devices are shown in Fig. 5; the axis studs 1 and 2, upon which the lapper-carrier levers or arms 42 and 43 are fulcrumed, being then approximately horizontal. This position is maintained by the pull of the springs 53 and 58, while the levers 59 and 63 are inactive. When the fulcrums are thus at primal positions the lappers may be elevated or swung upward by the downward pressure of the levers 59 and 63, acting against the tails or rearwardly extended portions of the carrier-arms 42 and 43 respectively. Such action is illustrated by dotted lines on Fig. 5. This upward swing of the lappers 40 and 41, and grip devices 30 clears the way for the convenient placement of the cigar, or article to be banded, upon the rest 12, and for the direct feeding of the bands from the holder to the place of affixment, which is accomplished by the movement of the glue-applying devices. The two lappers are brought downward at the opposite sides of the cigar (see Fig. 2) approximately even with each other, by the swing movement of the carrier-arms; when one is oscillated to the left and the other is subsequently oscillated to the right. The advance or first part of the oscillative movement is preferably yieldably controlled by the springs 53 and 58, and the retreat or latter part of the oscillative movement is controlled by the levers and cams, which is a positive movement. Suitable stops may be provided for arresting the return movement of the oscillators at the desired primal position.

A stop device 69 is provided adjacent to the hinging joint for each of the lappers, to prevent the lapper swinging inward beyond a predetermined limit. Said stop, in the present instance, consists of a projection fixed on the carrier-arm, and extends beneath the lug n upon the back of the lapper blade.

Combined with the over-closing lapper 41, in some instances, there can be employed means for releasing the pressure by throwing the end of the lapper slightly away from the band as it reaches the limit of its working stroke, so that said lapper will not drag on the surface of the band while performing its return movement. Said means, as herein shown, (see Fig. 17) consists of an endwise movable rod or element 70 mounted upon the carrier-arm, and having an incline or cam surface 71 that engages and disengages with a lug on the lapper head in such manner that at one position the force of the lapper-spring 68 will be overcome, permitting or compelling the lapper to swing slightly away from the cigar, and when moved in the other direction will release and allow the spring 68 to press the lapper inward with its normal force. The rod 70 is best operated by suitably positioned tappets or inclined lugs whereby the member 70 is actuated at either limit of the oscillative movement of the carrier-arm 43, thus when the lapper performs its function of closing and sealing the band it works with the required pressure, but while returning it exerts little or no pressure upon the band.

The band-closing mechanism is preferably provided with means for preventing contact of the lappers 40 and 41 with each other while closing-on the bands. For this purpose one of the oscillator-sleeves 44 is furnished with a projection 72 (see Fig. 15) located at suitable position thereon, and preferably having an adjusting screw 73 therein, while the other oscillator 45, or its sheave disk 47, is furnished with a counter lug or abutment 74 for coacting with said first-named projection. The projection 72 and lug 74 are disposed at such predetermined positions as to be brought together by opposite movements of the oscillators, before the lappers can come into contact with each other.

As illustrated in Figs. 14 and 15, which are views, respectively, from opposite directions, as the under-tucking-lapper 40 moves from 1$^a$ to 2$^a$ the lug 72 moves from 1$^c$ to 2$^c$; then as the overclosing lapper 41 moves forward from 1$^b$ to 2$^b$, the lug 74 moves from 1$^d$ to 2$^d$ meeting the end of screw 73 and forces backward the oscillator hub 44 and undertucking lapper carried thereon. For effecting this backward movement the spring 58 is made of greater power than the spring 53, so that when the lever 51 is relieved by the form of its cam 52, the superior spring will overcome and control the inferior spring; the latter, however, keeping the under-tuck lapper 40 as near to the advancing overclosing lapper 41 as the contacting lugs 72 and 74 will permit. By means of the adjusting screw 73 the adjacence of the working relation of the lappers may, to some extent, be regulated.

The cigar C may be placed upon the rest 12 by hand, one at a time, at the position indicated by dot-and-dash line on Figs. 1 and 3, for receiving the bands which are affixed automatically by the action of the mechanism above described. Combined with the band-affixing means I preferably employ a discharging mechanism which consists of a revoluble head 77 having a series of arms 78, each provided with a grasping means that embraces the cigar around the freshly applied band and raises it from the rest, retaining the same as the head and arms revolve, by intermittent motion, until the arm reaches the predetermined position for delivery, and then releases the cigar. The head 77 is mounted upon a stationary shaft 79 which also supports an oscillating sleeve 80, having a radial ear that carries a pivotally attached pawl 81 which engages with notches or recesses 82 in the head, and having a second ear 83 that is connected by a link 84 with a lever 85 fulcrumed on the rod F$^1$, and actuated by a cam 86, on shaft 3, whereby movement is imparted to the sleeve and pawl 81 for intermittently advancing the rotation of the head and arms step by step, coincident with the banding operations. A locking pawl 87 serves to retain the head against backward movement.

The grasping means upon the arms 83 may be of any suitable construction adapted for seizing, carrying and releasing the banded cigars, or for preventing the loosening of the band before the glue thereon is completely set. As shown in Figs. 1 and 3, each arm is furnished with a carrier-jaw comprising a flexible strip or loop 89 bridging across a recess or concave curvature upon the arm, and a swinging jaw 90 having its lever member pivoted upon the arm at 91, and its opposite end provided with a roll-stud that runs against a stationary cam 92 supported upon the fixed shaft 79, whereon the radially armed head revolves; the swinging-jaw 90 being opened or closed at the predetermined times by the action due to the shape of the cam 92. The flexible strip or loop 89 can be of leather, rubber, woven webbing or similar material, and is supported upon the arm by transversely projecting studs 93 and 94 at either end of the concavity, or in other approved manner; the flexible strip forming a self-adjusting cushion which moves upward beneath the cigar lying upon the rest and lifts it therefrom, while the jaw 90 closes down upon the top of the cigar, thereby embracing the banded portion securely between the jaws 89 and 90, which thus hold and carry the cigar to a predetermined position, or until the roll-stud of the jaw-lever runs upon the swell of the cam at 95; then the grasping jaw is thereby opened and the banded-cigar falls therefrom and may be delivered into any form of receptacle placed for its reception. Suitable springs 96 may be employed for closing the jaws 90 with a yielding pressure, the cam serving for positively opening the jaws and keeping the same open as they approach the cigar upon the rest.

Any suitable means can be employed for applying motive power to the shaft 3, but preferably an automatic-stop clutch of some approved type, that normally throws out of action at each rotation of the shaft. Such clutches being well known, I have merely (to indicate its location) shown the outline of the pulley, as at D. The various cams are made of suitable forms to give the required character, extent and quality of movement, and the proper timing, to the respective parts actuated thereby.

The operation of the mechanism is as follows; The glue-applying device or roll 15 is first swung upward, or caused to contact with the bottom of the pack of bands B supported upon the holder H, thereby applying gum or glue to the lower band, near or at one end thereof only, and withdrawing said band as the parts recede, leaving it projecting from the glue device to be laid thereby, in the manner indicated in Fig. 8, across the cigar, which has been meanwhile placed upon the rest 12—13 for its reception. As the band is delivered across the cigar (see dotted lines I Fig. 8) the grip-device 30 is caused to descend and press thereon, holding the band positioned while the glue-devices make further downward movement, (see dotted lines J on Fig. 8) which peels the glued end of the band from the face of the gluing device. The closing lappers 40 and 41 then descend at either side of the grip to the position indicated in Figs. 2 and 5; their thin ends coming to or slightly below the central plane of the cigar, thereby bending the respective ends of the band downward at each side of the cigar as shown in Fig. 2. The under-tucking lapper 40 is then given an oscillative movement that carries it from the position 1$^a$, shown in full lines, to the position 2$^a$ shown in dotted lines on Fig. 14; thereby closing the unglued end of the band around beneath the cigar or cylindrical article, and tucking it under the other end, which action is immediately followed by the oscillative movement of the over-closing lapper 41 which swings from the position 1$^b$, indicated by dotted lines, to the position 2$^b$ shown by full lines on Fig. 14, during which movement the advancing end of the lapper passes the glued end of the band around beneath the cigar, closing and sealing it upon the previous closed end, as illustrated. At the same time the under-tucking lapper 40 retreats as the over-closing lapper advances, so that normally there is no contact of the lappers, nor of the glued portion of the band with the end of the under-tucking lapper, as the band is affixed. As the lapper 41 reaches the limit of its movement the device 70 is forced against the lug $n$, causing the thin end of the lapper to swing slightly outward sufficient to relieve its pressure from the band $b$, but not too far. After affixing the band, the lappers return to their primal position and are elevated out of the way by the tilting of the carrier-arms. The discharge mechanism swings up its arm 78 and closes its jaws 89 and 90 about the banded cigar, and lifts it from the rest, carrying it one step toward the place of delivery. Another cigar is then placed upon the rest and the operation repeated.

I am aware that in practising my invention changes in the form of embodiment may be made by those skilled in the art, without departing from the nature and scope of the invention as expressed in the claims. I do not, therefore, wish to be limited to the special construction in detail as shown and described; but

What I claim as of my invention and desire to secure by Letters Patent, is—

1. In a machine of the character specified, a band-holder provided with means for supporting a pack of bands for bottom delivery therefrom, a glue-applying roller disposed approximately cross-wise in relation to the bands, means for bringing the face of said roller into contact with the lowermost band of the pack near one end thereof, and for depressing said roller to remove said band and support the same in position for affixment, and means for affixing said band around a cigar or the like.

2. In a banding machine, a band-supply holder, an upwardly inclined arm whereon said holder is mounted, a swinging glue-applying means, said holder-supporting arm and said glue-applying means being disposed approximately radial from a common center, and one of said parts being movable for bringing the glue-applying means and band-holder into adjacent relation with each other for contact of said glue-applying means with a band upon said holder; in combination with work-supporting and band-affixing mechanisms.

3. In a machine of the class specified, in combination, a band-holder, an arm supporting said band-holder, arranged in upwardly inclined relation to the plane at which the bands are presented for affixment, a swinging glue-supply mechanism that takes a band adhesively from said band-holder by contact with the bottom band near one end thereof, and delivers said band at position for its affixment, and means for regulating the inclination of said holder-supporting arm.

4. In a banding machine, the combination of a top-charged bottom-delivering holder adapted for supporting a pack of bands or labels, a stationary work-supporting rest, a glue-supplying means comprising an upwardly and downwardly swinging glue-box and glue-applying device, means for actuating said glue-box for swinging the glue-applying device into contact with the pack of bands, and down to a position for delivering the band across a cigar placed upon said rest, and a further downward movement below the place of band delivery, and means for closing the band around the cigar.

5. In a banding machine, the combination with the glue-box having a scraper edge, a glue-applying roller within said glue-box, a swinging arm carrying said glue-box, a rocker device pivoted to the glue-box-carrying arm, and having the glue-roll shaft bearings thereon, and an adusting screw in said rocker, a spring for said rocker acting in opposition to the screw, and means for imparting swinging movement to the glue-box arm, for the purposes set forth.

6. In a banding machine, a band-holder, an arm supporting said band-holder, a stationary work-supporting rest, a swinging arm carrying a glue-box, a glue-applying roller in said glue-box and having its shaft mounted in connection with the glue-box arm, a ratchet mounted on the glue-roll shaft, a pawl mounted upon the holder-supporting arm and adapted for engaging said ratchet, and an actuating means for elevating and depressing the glue-box mechanism.

7. In a cigar-banding machine, a cigar-supporting rest formed of two portions that carry the respective ends of the cigar, with intervening space, individually controlled right and left band-affixing devices that move circumferentially about the cigar within said space, and means for independently actuating said affixing devices.

8. In a cigar-banding machine, a bifurcated or two-part work-supporting rest having an intermedial space that affords unobstructed circumferential area about a cigar or the like laid thereon; band-affixing means comprising oppositely directed oscillating lapping members, right and left lapper-carrier devices that coöperate therewith for circumferentially passing the ends of the lapping members and band concentrically about the cigar, coincident with said space, and lapping the ends of said band together within said intermedial space.

9. In a machine of the class described, the combination of a lapper-carrier having oscillative movement, a forwardly projecting plate mounted upon said carrier and having its fore end adapted for lapping or passing the end of a label or band beneath the body of a cigar, or the like, intermediate to its respective ends; and a dual supporting rest having top-cradle sections that uphold the respective ends of the cigar, with an intermediate space between said sections, said rest disposed for supporting the cigar in approximate longitudinal alinement with the oscillative axis of said lapper-carrier.

10. In a cigar-banding machine, in combination, a dual rest having an intervening space and channel-top members for holding a cigar across said space, means for gumming and delivering a band transversely above said space, a band-laying member consisting of an approximately wedge-shaped plate having a bearing at its head, a carrier for said band-laying member comprising a longitudinally projecting arm having a cylindrical end whereon said member is journaled, and means carried on said arm for yieldingly pressing its end upon the band and laying the same by a circumferential action, said carrier being connected with an axial support in central alinement with, but beyond the end of the channeled top member of said rest.

11. In a banding machine, in combination with means for affixing bands, a supporting rest for the cigar composed of two parts, each provided with a cradle-like top portion, with an interval of space between said portions, and means passing in said space for automatically lifting the cigar from the rest.

12. In a machine of the class described, the combination with a band-holder adapted for supporting a pack of cigar bands in oblique position and having a guide-stake at the lower end of the pack, and a glue-applying means for taking bands from the bottom of the pack; of a follower mechanism including an angular follower-plate provided with a face portion adapted to rest upon the top of the pack, and an upstanding end projection that slides against the lower guide-stake, a follower-rod, a resistance clutch therefor, and means for retaining the end of the rod in its proper relation to said plate.

13. In a banding machine, in combination with band-affixing mechanism, a band-supply holder, and glue-applying devices for taking bands singly from the supply-holder to the affixing mechanism by adhesive contact at one end of the band; of means for forming a crimp or offset bend at the opposite end of the band, preparatory to its delivery to the affixing mechanism.

14. In a banding machine, in combination with a band-holder for carrying a pack of bands or the like, an end-crimping means comprising a stationary supporting member having an annular edge extending transversely beneath the pack for sustaining the bands near the end thereof, and an oscillating jaw that swings past the angle of said supporting member for bending the end of the band across said stationary member, and means for actuating said jaw.

15. In a banding machine, the combination, of a band-supply holder having means for supporting a pack of bands thereon for bottom delivery, a picker means that takes bands, one at a time therefrom; a crimper-device for producing a bend adjacent to the unglued end of the band, and means for operating said crimper-device synchronously with the picker action.

16. In a banding machine, the combination, of a band-supply holder having means for supporting a pack of bands or the like, a glue-applying means for adhesively withdrawing single bands from said holder by contact with one end thereof, a crimper device mounted upon said band-holder and comprising jaws that engage and offset the opposite end of said band, and means for positively actuating said crimper device by or in unison with the action of said glue-applying means.

17. In a banding machine, the combination, with the band-supply-holder, its supporting-bar, the swinging glue-box arm having a pivoting hub, a projecting tappet-finger thereon, an oscillating crimper jaw, its axle mounted in the band-holder bracket, a crank-arm fixed on said axle, a connection from said arm adapted for engagement by said tappet-finger, and a retracting spring for returning the parts to primal position.

18. In a banding machine, the combination, of a band-supply holder having means for supporting a pack of bands thereon for bottom delivery, a glue-applying picker that takes bands, one at a time, therefrom and delivers the same for affixment, a cigar-supporting rest, a central gripping means opposite said rest, and two oppositely moving members that oscillate about a common axis with the cigar upon said rest for passing the respective end of the band beneath the cigar and sealing one end upon the other, substantially as set forth.

19. In a banding machine, a band-supply-holder having means for supporting a pack of bands disposed in oblique position; in combination with a glue-applying means that contacts with the bottom band on the pack by an upward swinging action, takes a band therefrom and delivers the same at the place of affixment by downward swinging movement, a cigar-holding rest, means for gripping the band to a cigar laid thereon, a pair of band-affixing devices, and means for effecting right and left oscillation of the respective band-affixing devices.

20. In a banding machine, the combination with a work-supporting rest, and means for gluing and delivering bands adjacent thereto; of a radially swinging oscillatably supported carrier, a support for said carrier in endwise alinement with the work-supporting rest, a projecting laterally swinging lapper-blade pivotally mounted on said carrier, means for yieldingly pressing said lapper-blade toward the work, means for limiting the swing of the lapper-blade, and means for oscillating the carrier.

21. In a banding machine, a band-affixing means comprising a pair of right and left lapper-blades having wedge-shaped ends, carriers consisting of longitudinally extended swinging arms whereon said lapper-blades are pivotally supported, said arms fulcrumed upon laterally projecting pivot-studs, a pair of independently oscillatable supporting members for said studs, both mounted upon a common center-axle about which said carrier-arms move in circular arcs, means for holding the cigar or article in line with the axis of said center-axle while the band is applied, springs that yieldingly press the ends of the lapper-blades against the surface of the band, means for tilting the carrier-arms on their fulcrums, means limiting their tilting movement, and mechanism for actuating and controlling the oscillating movements of said supporting members.

22. In a cigar-banding machine, the combination of a bander-axis shaft, a work-supporting rest adapted for holding a cigar in approximate end-wise longitudinal alinement with said bander-axis shaft, a pair of separately rotatable hubs both mounted upon said shaft, lapper-carrier arms respectively connected with said hubs and extending longitudinally over said rest, band-affixing lapper-blades journaled on the projecting ends of said arms, finger-springs thereon for keeping the lappers in proper relation, and means for effecting and controlling partial rotation of the respective hubs right and left upon said bander-axis shaft.

23. In a machine for affixing bands, the combination with a work-supporting rest, and means for gluing and delivering bands adjacent thereto; of a pair of carrier-arms, oscillatable supporting hubs whereon said carrier-arms are individually pivoted, said supporting-hubs mounted on an axial shaft in approximate alinement with the head of said rest, band-affixing devices carried by the respective arms, means for imparting oscillative movement to said hubs and arms, and means for swinging said arms on their individual pivoting axis.

24. In a banding machine, the combination of right and left oscillating band-affixing devices, and oscillating hubs upon which said affixing devices are carried, said hubs each provided with a sheave thereon, a chain attached to and passing over said sheave, a pull-spring attached to one end of said chain, a swinging lever connected with its other end, and means for actuating said lever for controlling the movement of said oscillating parts.

25. In a machine of the class described, the combination, of the label-affixing lappers, swinging carrier-arms therefor, oscillating hubs to which said carrier-arms are pivoted, depressing levers for tilting the respective carrier-arms, cams for controlling said depressing levers, and a retracting spring and a stop for returning each of the carrier-arms to its primal position.

26. In a machine of the class described, a band-lapping mechanism, comprising a carrier-lever, a projecting laterally swinging band-lapping member hingedly mounted upon said carrier-lever, a spring for said lapping member, an oscillatable supporting hub, an axis shaft therefor, a transverse fulcrum pivot connecting said carrier-lever and hub, stop devices for limiting the swing of the carrier-lever, means for positively effecting upward swing of the carrier-lever, a retracting spring therefor, and means for imparting oscillative movement to the supporting hub.

27. In a banding machine, an oscillatable and radially movable wiper for passing or lapping the end of a label or band beneath a cigar or the like, a stationary dual supporting rest provided with cradle sections adapted to support the cigar or article in alinement with the axis of oscillation, and at either side of said wiper; means for imparting oscillative movement, and means for imparting radial movement to said wiper, and means for gluing and presenting a band between said wiper and said rest.

28. In a machine of the class described, the combination of the carrier-arm having a cylindrical bearing end, the lapper-devices consisting of a wedge-shaped plate having its head pivotally mounted on said arm, said plate provided with an outwardly projecting lug, and a wire spring attached to the arm and engaging an opening in said lug, for the purpose set forth.

29. In a machine of the class described, the combination, of a cigar-supporting rest having an intermedial space, means for presenting a band transversely above said space to a cigar or the like lying upon said rest, a grip device for centrally retaining the band temporarily against the cigar, a primary acting push-device for lapping one end of the band beneath the cigar, a second acting push-device for lapping the other end of the band beneath the cigar, means for separately actuating said push-devices, and means for advancing and retracting the grip-device.

30. In a banding machine, the combination, of a work-supporting rest, right and left acting band-affixing members, an oscillatable supporting means therefor having its axis approximately in alinement with said rest, means for oscillating the respective band-affixing members, a grip-device located between the band-affixing members, a transversely disposed rockable carrier having an arm carrying said grip-device, and means for actuating said rockable carrier for elevating and depressing the grip-device.

31. In a machine of the character described, in combination, the right and left wiping lappers, carriers therefor mounted upon oscillatable sleeves or hubs, an operating chain for each sleeve, said chain connected at one end with an actuating lever and at its other end with a pull-spring acting in opposition to said lever, the spring for the second acting lapper being of a power and tension sufficient for overcoming and dominating the power and tension of the spring for the first acting lapper, when brought into opposing relation, and means for controlling the movement of the actuating levers.

32. In a cigar banding machine, the combination with oppositely oscillating lapper-devices for overlapping the respective ends of the band, and a pair of independently actuated lapper-carriers movable right and left in circular axis about a common center axis for carrying the respective lapper-devices around the cigar; of counter-engaging stop-members moving in connection with the respective lapper-carriers and adapted, by their opposing engagement, for limiting the approach or advancing movement of one of lapper-devices in its relation to the other, irrespective of the extreme degree to which the latter may be carried as they are brought together for closing the band.

33. In a banding machine, comprising a pair of right and left oscillating label-affixing lappers, carrier-arms therefor, and oscillating hubs on which said carrier-arms are mounted; of counter-engaging contact devices combined with said hubs for preventing collision or contact of the lapper-blades while placing the bands.

34. In a banding machine, in combination, a pair of band-affixing lappers consisting of an undertucking lapper and an overclosing lapper, a carrier means therefor successively actuating said lappers to overlap the ends of a band, one upon the other, and an automatic throw-off device for relieving the pressure of the overclosing lapper against the band during the backward movement.

35. In a banding machine, the combination of a band-affixing lapper member that passes the end of the band beneath the cigar by an oscillative movement, a carrier-arm having said member pivotally mounted thereon, said parts provided with opposed lugs for limiting the pivotal action, a spring for pressing the lapper member against the surface of the band, and a counter acting device mounted upon the carrier-arm and engageable at a predetermined position for throwing off the pressure of the lapper from the band at or near the end of the lapping movement.

36. In a banding machine, the combination described, of a stationary positioning rest, a swinging glue-applying means adapted for gluing and delivering bands; retractable oscillating lappers adapted for affixing the band about a cigar or the like, positioned upon said rest, a transferring mechanism consisting of a rotatable head carrying a series of projecting arms each having a curved recess and cigar-receiving seat at its outer end, and a swinging lever pivoted on the arm and carrying a jaw that acts in conjunction with said seat for clasping the cigar at the band-affixing position and lifting it from said rest, and for delivering the same at a predetermined position, a supporting axle for said rotatable head, a cam mounted on said axle and having a surface for controlling the jaw-levers, means for oscillating said lappers and for retracting the same out of alinement with the rest, and means for intermittently actuating said rotatable transfer mechanism in alternate time with the band-affixing action.

37. In a banding machine, a divided positioning and supporting rest, a band-gumming device having vibrative action for placing a band in alinement with the division of said rest, right and left yieldably-pressing band-lapping members, carrier means adapted for advancing and retracting said band-lapping members to and from the positioning rest, means for moving said members in opposite circular arcs partly around an article positioned upon the rest, a transferring arm arranged to swing through the dividing space in the rest, and provided with gripping-devices that lift the banded article from its position upon said rest, and means for actuating said lifting arm synchronously with the retraction of the band-lapping members.

38. In a banding machine of the class described, the combination, with mechanism for gumming and delivering bands, a divided stationary positioning rest, a retractable means for lapping and sealing a band about a cigar placed upon said rest; of a transferring carrier consisting of a rotatable series of radial arms, each provided with a flexibly yielding lifting-seat and a self-closing gripping member, said arms arranged to pass through the space dividing the rest, and for taking the cigar off said rest with the freshly sealed ends of the band confined by or against said yieldable seat, means for rotatably moving said series of arms intermittently with and alternately to the action of the band-lapping and sealing means, and an axially supported cam adapted for controlling the action of said gripping members.

39. In a banding machine, in combination with an independent standing support adapted for resting a cigar thereon, means for lapping and sealing the ends of a band about a cigar, or the like, laid upon said support, an independent transferring carrier provided with a projecting arm, having means for taking the cigar off said standing support, and for confining the freshly applied band while removing the cigar from the band-receiving position.

40. In a banding machine, in combination with means for affixing bands, a transferring mechanism comprising a revoluble series of arms, each having a flexible fabric-jaw mounted on the arm, a swinging lever-jaw pivoted to the arm and closing toward said flexible jaw, a roller-stud on said lever-jaw, a cam for actuating said lever-jaw, and means for intermittently advancing said series of arms.

41. In a banding machine, in combination with the supporting rest, and means for affixing a band to a cigar or the like, placed thereon; a delivery mechanism comprising a rotatable head having a series of arms, gripping jaws carried on said arms, an oscillating sleeve provided with ears, a stationary shaft supporting said sleeve, a pawl carried by an ear of said sleeve and engaging to intermittently rotate said head, a cam fixed on said stationary shaft and having a surface for controlling said jaws, a swinging lever connected for oscillating said sleeve, and an operating shaft carrying a cam for controlling said lever.

42. A banding machine comprising, in combination, substantially as described, a work-supporting rest, an overhanging band-supply holder having adjustable means for sustaining a pack of bands for bottom-delivery therefrom, a vertically swinging glue-box and gluing roller for passing the bands from the holder to the rest, right and left oscillating band-affixing devices, retractable carriers therefor mounted upon oscillatable hubs, a support for said hubs axially in line with the work-supporting rest, means for oscillating said hubs, a grip-device, a rocker carrying said grip-device, a series of levers with connections for respectively operating said hub-oscillating means, band-affixer carriers and grip-carrier, fulcrum-bars supporting said levers, and a rotatable shaft provided with a series of cams for actuating the respective levers and swinging glue-box, for the purpose set forth.

43. In a cigar-banding machine, the combination with means for supporting a cigar, and means for gluing and presenting a band thereto, of band-affixing devices that lap the ends of the band about the cigar at a predetermined position, means for imparting the band-affixing movement thereto, means for shifting said affixing devices into and out of range with said position, and a cigar-transferring means provided with devices for seizing the cigar at the position where the band is affixed thereto.

44. In a machine of the class described, in combination with means for gumming and delivering individual bands; a pair of band-lapping blades, a pair of carriers therefor movable in approximately concentric relation to the cigar, said lapper-blades comprising an under-tuck lapper having a semi-circular movement that lays one end of the band about the cigar and retains it in contact thereon, and a second or overclosing lapper having opposite semicircular movement that passes the other end of the band about the cigar, said under-tuck lapper acting to confine the first laid end of the band until the second end has passed onto the first to a sufficient degree to secure it in place, and means for operating said lapper carriers in the manner set forth.

Witness my hand this 4th day of October 1910.

FRANK O. WOODLAND.

Witnesses:
   CHAS. H. BURLEIGH,
   FRANK A. DRURY.